US012741295B2

(12) United States Patent
Yewale et al.

(10) Patent No.: US 12,741,295 B2
(45) Date of Patent: Sep. 22, 2026

(54) METHOD FOR FABRICATING A FILM

(71) Applicant: Turun Yliopisto, Turun yliopisto (FI)

(72) Inventors: Rahul Balu Yewale, Turun yliopisto (FI); Mikko Salomäki, Masku (FI); Pia Damlin, Littoinen (FI); Carita Kvarnström, Turku (FI)

(73) Assignee: TURUN YLIOPISTO, Turun Yliopisto (FI)

( * ) Notice: Subject to any disclaimer, the term of this patent is extended or adjusted under 35 U.S.C. 154(b) by 1106 days.

(21) Appl. No.: 17/608,275

(22) PCT Filed: Apr. 22, 2020

(86) PCT No.: PCT/FI2020/050261
§ 371 (c)(1),
(2) Date: Nov. 2, 2021

(87) PCT Pub. No.: WO2020/221958
PCT Pub. Date: Nov. 5, 2020

(65) Prior Publication Data

US 2023/0347379 A1 Nov. 2, 2023

(30) Foreign Application Priority Data

May 2, 2019 (FI) ..................................... 20195357

(51) Int. Cl.
*B05D 1/00* (2006.01)
*B05D 1/36* (2006.01)
(Continued)

(52) U.S. Cl.
CPC ............... *B05D 1/60* (2013.01); *B05D 1/005* (2013.01); *B05D 1/36* (2013.01); *B05D 3/0254* (2013.01); *B05D 5/12* (2013.01); *B05D 2518/00* (2013.01)

(58) Field of Classification Search
CPC . B05D 1/60; B05D 1/005; B05D 1/36; B05D 3/0254; B05D 5/12
See application file for complete search history.

(56) References Cited

U.S. PATENT DOCUMENTS 5,225,495 A 7/1993 Han et al.
2003/0045663 A1 * 3/2003 Kim .................... C08G 61/125 526/260

(Continued)

FOREIGN PATENT DOCUMENTS

CN 101106868 A 1/2008
CN 104118179 A 10/2014

(Continued)

OTHER PUBLICATIONS

International Search Report dated Aug. 3, 2020 for corresponding International Application No. PCT/FI2020/050261.

(Continued)

*Primary Examiner* — Dah-Wei D. Yuan
*Assistant Examiner* — Kristen A Dagenais
(74) *Attorney, Agent, or Firm* — Tarolli, Sundheim, Covell & Tummino LLP

(57) ABSTRACT

A method for fabricating a film comprising at least one polymer layer, formed of polyazulene, or of a copolymer, wherein one of the monomers is azulene, or of any combination thereof, wherein the film is situated on at least one surface of a substrate, is disclosed. The method comprises the steps of: a) forming an oxidant layer on a deposition surface by applying a solution comprising an oxidant on the deposition surface; b) forming a polymer layer formed of polyazulene, or of a copolymer, wherein one of the monomers is azulene, or of any combination thereof, by exposing the deposition surface to at least azulene monomer vapour at a polymerization temperature of 20-95° C. under atmospheric pressure, wherein step a) precedes step b), and (Continued)

wherein, during step b), the temperature of the deposition surface differs from the polymerization temperature by 0-30° C.

13 Claims, 5 Drawing Sheets

(51) Int. Cl.

| | |
|---|---|
| ***B05D 3/02*** | (2006.01) |
| ***B05D 5/12*** | (2006.01) |

(56) References Cited

U.S. PATENT DOCUMENTS

| | | | | |
|---|---|---|---|---|
| 2003/0157317 | A1 | 8/2003 | Takeo | |
| 2006/0275547 | A1* | 12/2006 | Lee | C23C 14/50 427/248.1 |
| 2007/0196643 | A1 | 8/2007 | Park et al. | |
| 2008/0008824 | A1 | 1/2008 | Cho et al. | |
| 2009/0117268 | A1* | 5/2009 | Lewis | C23C 8/10 427/205 |
| 2010/0163808 | A1 | 7/2010 | Chen et al. | |
| 2011/0261430 | A1 | 10/2011 | Mazurkiewicz et al. | |
| 2012/0312384 | A1 | 12/2012 | Robinson | |
| 2013/0068294 | A1* | 3/2013 | Clark | H01G 9/2022 257/E31.124 |
| 2013/0328026 | A1* | 12/2013 | Bhansali | H01G 4/18 257/40 |
| 2015/0275016 | A1* | 10/2015 | Bao | C09D 7/67 252/511 |
| 2015/0332804 | A1* | 11/2015 | Wood | B05D 1/60 427/58 |
| 2017/0100743 | A1* | 4/2017 | Pore | B05D 1/60 |
| 2018/0158616 | A1 | 6/2018 | Lazarev et al. | |

FOREIGN PATENT DOCUMENTS

| | | | |
|---|---|---|---|
| CN | 104350625 | A | 2/2015 |
| JP | H08187940 | A | 7/1996 |
| JP | 2004180552 | A | 7/2004 |
| JP | 2007251093 | A | 9/2007 |
| JP | 2008537016 | A | 9/2008 |
| JP | 2009074055 | A | 4/2009 |
| JP | 2018157028 | A | 10/2018 |
| KR | 20140031140 | A | 3/2014 |
| KR | 20140067237 | A | 6/2014 |
| KR | 20170076186 | A | 7/2017 |
| KR | 20180007607 | A | 1/2018 |
| WO | 2013184797 | A1 | 12/2013 |
| WO | 2018102709 | A1 | 6/2018 |
| WO | 2019211510 | A1 | 11/2019 |

OTHER PUBLICATIONS

Huang, X., et al. (1988). "Surface plasmon study of electrochemically prepared polymers: Polyazulene." Synthetic Metals, vol. 24(3), pp. 245-253. doi:10.1016/0379-6779(88)90263-9.

Yewale, R.B., et al. (2017). "Vapor phase polymerized highly conducting PEDOT films as electrode and high capacitance material", 11th Annual MATSURF Seminar, Nov. 6, 2017.

Finnish Search Report dated Nov. 27, 2019 for corresponding application No. FI 20195357.

Japanese Office Action dated Mar. 5, 2024 for Japanese Patent Application No. 2021-564485.

Gradzka, Emilia et al., Chemically formed conducting polyazulene: From micro- to nanostructures, Synthetic Metals, Oct. 19, 2018, vol. 246, pp. 115-121.

First Notice of Examination dated Jul. 5, 2022 for Applicant No. 202080032987.9, 14 pages.

The Second CN Office Action dated May 7, 2023 for Application No. 202080032987.9, 28 pages.

The Third CN Office Action dated Sep. 29, 2023 for Application No. 202080032987.9, 9 pages.

Machine translation—General Higher Education "Thirteenth Five-Year Plan" Textbook Putong Gaodeng Iaoyu from 13 5" Guihua Jiaocai Semiconductor material Chief editor: He Geping, Wei Jianjindan, 11 pages.

Handbook of Film Science and Technology vol. 1. Compiled and Edited by Tian Minbo, Tsinghua University, 9 pages.

Compound Dictionary/Edited by Shen Panwen, Wang Jitao, et al. Shanghai: Shanghai Dictionary Publishing, Publishing House, Jun. 2002. 9 pages.

Machine translation—Handbook of Thin Film Science and Technology vol. 11; Tsinghua University C Xuetian Minbo, 10 pages.

KR Notice of Allowance with English translation dated Feb. 20, 2026; regarding Application No. 10-2021-7039535, 5 pages. English abstract provided.

* cited by examiner

| Entry | Variable parameter | | Roughness (nm) | | Sheet resistance (MΩ/□) | | Conductivity (S/cm) | | | | Absorbance at 420 nm (A) | Thickness range (nm) | |
|---|---|---|---|---|---|---|---|---|---|---|---|---|---|
| | | | RMS | $R_{avg}$ | Before washing | After washing | Before washing Low to high | | After washing Low to high | | | | |
| 1 | Polymerization temperature (°C) | 25 | 6.7 | 5.0 | NC | 69.0 | NC | NC | 0.01 | 0.03 | 0.0561 | 4.675 | 11.22 |
| 2 | | 35 | 17.1 | 13.0 | 62.3 | 6.6 | 0.00 | 0.01 | 0.04 | 0.10 | 0.1745 | 14.5 | 34.9 |
| 3 | | 45 | 23.5 | 18.5 | 9.2 | 7.3 | 0.03 | 0.06 | 0.03 | 0.08 | 0.2156 | 18.0 | 43.1 |
| 4 | | 55 | 23.0 | 18.2 | 3.6 | 9.7 | 0.06 | 0.15 | 0.02 | 0.06 | 0.2227 | 18.6 | 44.5 |
| 5 | | 65 | 21.7 | 17.1 | 3.1 | 13.7 | 0.07 | 0.18 | 0.02 | 0.04 | 0.2156 | 18.0 | 43.1 |
| 6 | | 75 | 21.7 | 17.0 | 3.2 | 18.1 | 0.06 | 0.14 | 0.01 | 0.03 | 0.2648 | 22.1 | 53.0 |
| 7 | | 85 | 18.3 | 14.3 | 3.5 | 19.5 | 0.05 | 0.12 | 0.01 | 0.02 | 0.2846 | 23.7 | 56.9 |
| 8 | | 95 | 23.4 | 18.6 | 3.7 | 20.5 | 0.05 | 0.11 | 0.01 | 0.02 | 0.2909 | 24.2 | 58.2 |
| 9 | Deposition surface temperature (°C) | 25 | 21.7 | 17.1 | 3.9 | 18.6 | 0.07 | 0.16 | 0.01 | 0.03 | 0.1878 | 15.7 | 37.6 |
| 10 | | 35 | 21.6 | 16.8 | 3.0 | 16.3 | 0.08 | 0.20 | 0.02 | 0.04 | 0.2007 | 16.7 | 40.1 |
| 11 | | 45 | 20.5 | 16.2 | 3.2 | 14.5 | 0.08 | 0.18 | 0.02 | 0.04 | 0.2054 | 17.1 | 41.1 |
| 12 | | 55 | 23.7 | 18.0 | 5.1 | 15.1 | 0.05 | 0.12 | 0.02 | 0.04 | 0.2024 | 16.9 | 40.5 |
| 13 | | 65 | 20.7 | 16.3 | 6.3 | 24.2 | 0.04 | 0.09 | 0.01 | 0.02 | 0.2141 | 17.8 | 42.8 |
| 14 | | 75 | 23.0 | 18.2 | 6.8 | 24.1 | 0.03 | 0.08 | 0.01 | 0.02 | 0.2244 | 18.7 | 44.9 |
| 15 | Polymerization time (min) | 2 | 21.0 | 16.4 | 3.1 | 8.9 | 0.08 | 0.19 | 0.03 | 0.07 | 0.2040 | 17.0 | 40.8 |
| 16 | | 4 | 20.7 | 16.3 | 2.6 | 13.5 | 0.09 | 0.21 | 0.02 | 0.04 | 0.2186 | 18.2 | 43.7 |
| 17 | | 8 | 21.7 | 17.1 | 2.9 | 14.8 | 0.07 | 0.18 | 0.01 | 0.04 | 0.2272 | 18.9 | 45.4 |
| 18 | | 16 | 20.1 | 16.0 | 4.0 | 27.1 | 0.05 | 0.13 | 0.01 | 0.02 | 0.2347 | 19.6 | 46.9 |

Fig. 6

METHOD FOR FABRICATING A FILM

RELATED APPLICATIONS

The present application is a U.S. National Stage application under 35 USC 371 of PCT Application Serial No. PCT/FI2020/050261, filed on 22 Apr. 2020, which claims priority from FI application No. 20195357, filed on 2 May 2019, the entirety of each of which is incorporated herein by reference.

TECHNICAL FIELD

The present disclosure relates to a method for fabricating a film comprising at least one polymer layer. The present disclosure further relates to a film comprising t least one polymer layer. The present disclosure further relates to a device comprising the film and to the use of the film. The present disclosure further relates to a system for fabricating a film comprising at least one polymer layer.

BACKGROUND

Oxidation of azulene monomer undergoes polymerization at 1- and 3-position to give 1,3-polyazulene. Polyazulene (PAz) is a conducting polymer with a high capacitance and redox behavior. PAz films may be produced by electrochemical, chemical and photochemical polymerization. Because of the electronic properties, conducting and redox behavior as well as the fast charge-discharge nature, PAz films may be useful in applications related to the field of electronics, antistatic coatings, dye-sensitized or organic solar cells, electrochemical transducers, electrochromic devices, electroluminescent devices, organic light emitting diodes (OLED's), and supercapacitors in the near future. In order to be suitable for the above mentioned applications, PAz films may need to be highly-organized, homogenous, transparent and thin. Of the current methods, electrochemical polymerization may produce non-uniform films and require a conducting electrode substrate limiting its fabrication only to electrode materials whereas oxidative chemical synthesis may give the material in powder or granular forms. Further casting or processing may not be possible due to the insoluble nature of PAz. Because the production of high-quality PAz films having the desired properties may be challenging with the current production methods, new approaches may be needed.

SUMMARY

A method for fabricating a film comprising at least one polymer layer formed of PAz, or of a copolymer, wherein one of the monomers is azulene, or of any combination thereof, wherein the film is situated on at least one surface of a substrate is disclosed. The method may comprise the steps of:

a) forming an oxidant layer on a deposition surface by applying a solution comprising an oxidant on the deposition surface;

b) forming a polymer layer formed of PAz, a copolymer, wherein one of the monomers is azulene, or any combination thereof, by exposing the deposition surface to azulene monomer vapour at a polymerization temperature of 20-95° C. under atmospheric pressure, wherein step a) precedes step b), and wherein, during step b), the temperature of the deposition surface differs from the polymerization temperature by 0-30° C.

A film comprising at least one polymer layer formed of Paz, or of a copolymer, wherein one of the monomers is azulene, or of any combination thereof, wherein the film is situated on at least one surface of a substrate, wherein the total thickness of the film is 10 nm-100 μm, is disclosed.

A film comprising at least one polymer layer formed of PAz, or of a copolymer, wherein one of the monomers is azulene, or of any combination thereof, wherein the film is situated on at least one surface of a substrate obtainable by a method described in the present application, is disclosed.

A device comprising a film as defined in the present application is disclosed.

Use of the film as defined in the present application as an antistatic coating or an electrode in/of an electronic device, is disclosed.

A system for fabricating a film comprising at least one polymer layer formed of polyazulene, or of a copolymer, wherein one of the monomers is azulene, or of any combination thereof, wherein the film is situated on at least one surface of a substrate, is disclosed. The system may comprise:

a) an oxidant unit configured to apply a solution comprising an oxidant on a deposition surface for forming an oxidant layer on the deposition surface; and b) a chamber configured to expose the deposition surface to at least azulene monomer vapour at a polymerization temperature of 20-95° C. under atmospheric pressure for forming a polymer layer formed of polyazulene, or of a copolymer, wherein one of the monomers is azulene, or of any combination thereof, wherein the oxidant unit precedes the chamber, and wherein, in the chamber, the temperature of the deposition surface is configured to differ from the polymerization temperature by 0-30° C.

BRIEF DESCRIPTION OF THE DRAWINGS

The accompanying drawings, which are included to provide a further understanding of the embodiments and constitute a part of this specification, illustrate various embodiments. In the drawings:

FIG. 6 describes changes in roughness, sheet resistance, and conductivity of PAz films prepared with 240 mM $CuCl_2$.

DETAILED DESCRIPTION

Figure 1:
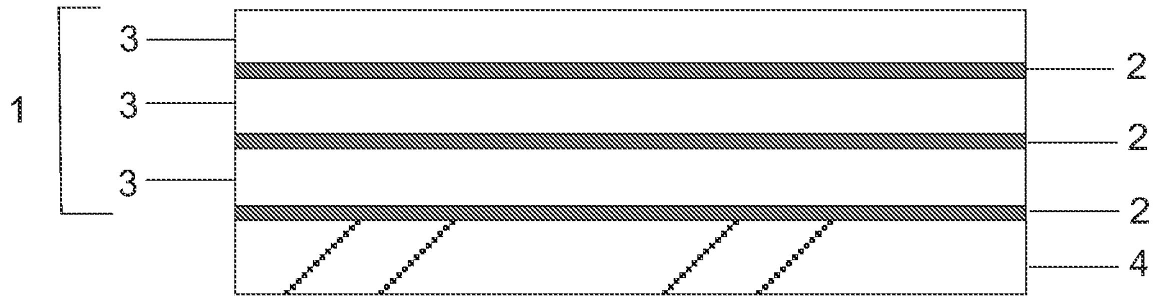
FIG. 1 is a schematic illustration of a film situated on a surface of a substrate according to one embodiment of the present invention.

The present application relates to a method for fabricating a film comprising at least one polymer layer formed of polyazulene (PAz), or of a copolymer, wherein one of the monomers is azulene, or of any combination thereof, wherein the film is situated on at least one surface of a substrate, wherein the method comprises the steps of:

a) forming an oxidant layer on a deposition surface by applying a solution comprising an oxidant on the deposition surface;

b) forming a polymer layer formed of PAz, or of a copolymer, wherein one of the monomers is azulene, or of any combination thereof, by exposing the deposition surface to at least azulene monomer vapour at a polymerization temperature of 20-95° C. under atmospheric pressure, wherein step a) precedes step b), and wherein, during step b), the temperature of the deposition surface differs from the polymerization temperature by 0-30° C.

The present application further relates to a system for fabricating a film comprising at least one polymer layer formed of polyazulene, or of a copolymer, wherein one of the monomers is azulene, or of any combination thereof, wherein the film is situated on at least one surface of a substrate, wherein the system comprises:

a) an oxidant unit configured to apply a solution comprising an oxidant on a deposition surface for forming an oxidant layer on the deposition surface; and b) a chamber configured to expose the deposition surface to at least azulene monomer vapour at a polymerization temperature of 20-95° C. under atmospheric pressure for forming a polymer layer formed of polyazulene, or of a copolymer, wherein one of the monomers is azulene, or of any combination thereof, wherein the oxidant unit precedes the chamber, and wherein, in the chamber, the temperature of the deposition surface is configured to differ from 20 the polymerization temperature by 0-30° C.

In the context of this specification the term "polymerization temperature" may refer to the temperature of the monomer vapour(s) during the polymerization step b). Polymerization temperature may also refer to the temperature of the reaction chamber or cell, inside of which the polymerization is carried out.

In one embodiment, in step b), the deposition surface is exposed to at least azulene monomer vapour and at least one further monomer vapour. In one embodiment, in step b), the deposition surface is exposed to at least azulene monomer vapour and at least one further monomer vapour selected from a group consisting of 3,4-ethylenedioxythiophene (EDOT), pyrrole, aniline, thiophene, and phenylene. In one embodiment, the at least one further monomer vapour is selected from the following: 3,4-ethylenedioxythiophene (EDOT), pyrrole, aniline, thiophene, phenylene, furans, ethylene, tetrafluoroethylene, vinyl chloride, propylene, methyl methacrylate, methyl acrylate, vinyl acetate, ethylene vinyl acetate, styrene, 1,3-butadiene, isoprene (2-methyl-1,3-butadiene), chloroprene (2-chloro-1,3-butadiene), isobutylene (methylpropene), polyethylene (PE), polypropylene (PP); polymethylpentene (PMP), polybutene-1 (PB-1); polyolefin elastomers (POE): polyisobutylene (PIB), ethylene propylene rubber (EPR), ethylene propylene diene monomer (M-class) rubber (EPDM rubber) and any type of polymer produced from a simple olefin as a monomer, cyclic olefin, vinyl ether, allyl ether, vinyl ester, allyl ester. Those monomers, which cannot be converted into a vapour, can be mixed with the solution comprising an oxidant and applied on the deposition surface during step a). In one embodiment, step a) comprises applying a solution comprising or consisting of an oxidant and at least one further monomer.

The present application further relates to a film comprising at least one polymer layer formed of PAz, or of a copolymer, wherein one of the monomers is azulene, or of any combination thereof, wherein the film is situated on at least one surface of a substrate, wherein the total thickness of the film is 10 nm-100 μm.

In one embodiment, the total thickness of the film is 20 nm-50 μm, or 50 nm-10 μm, or 100 nm-1 μm, or 200 nm-500 nm.

The present application further relates to a film comprising at least one polymer layer formed of PAz, or of a copolymer, wherein one of the monomers is azulene, or of any combination thereof, wherein the film is situated on at least one surface of a substrate, obtainable by the method of the present application.

In one embodiment, the method comprises repeating the step a) and b) one or more times.

In one embodiment, the method is carried out as a batch process. I.e. one film can be prepared at one go, e.g. in a reaction chamber or a cell, wherein the different method steps can be carried out. In one embodiment, the method is carried out as a continuous process. I.e. the substrate can be moved from one method step into the other without interruptions. E.g. being first coated with the oxidant and then exposed to monomer vapour(s). In a continuous process, several films may be prepared simultaneously.

In one embodiment, the film has a rigid structure. In one embodiment, the film is flexible. In one embodiment, the film may be rolled up.

In one embodiment, at least one catalyst and/or at least one catalyst additive are/is used in step b). In one embodiment, the at least one catalyst and/or catalyst additive is selected from the following: Ziegler-Natta catalysts, $AlCl_3$, $TiCl_3$, cerium ammonium nitrate, cerium tosylate, Fe(III) tosylateisalsousedasanoxidant, pyridine, p-toluenesulphonicacid (p-TSA), diethyleneglycol (DEG), molybdophosphoric acid, molybdo-2-vanadophosphoricacid, poly (styrenesulfonate) (PSS), Fe(III)alkylbenzenesulfonates, iodine, bromine, pyrocatechovoilet, benzenesulfonicacid (BSA), ptoluenesulfonicacid (TSA), dodecylbenzenesulfonicacid (DBSA), butylbenzenesulfonicacid (BBSA), glycerol, trialkylaluminum-free modified methylaluminoxane, TEMPO ((2,2,6,6-Tetramethylpiperidin-1-yl)oxyl or (2,2,6,6-tetramethylpiperidin-1-yl) oxidanyl), peroxides, chloride or iodide of Ti, V, Zr, Cr, W, Co and aluminum (Mg or Li) alkyl $TiCl_4$ with alkyl aluminium compounds in hydrocarbon solvent, titanium supported on magnesium salts, $VOCl_3$, $VCl_4$, or VO $(OR)_3$, with aluminum alkyls $RAlCl_2$, transitions metal (Zr, Ti or Hf) sandwiched between cyclopentadienyl rings, Cr, Mo, Co or Ni supported on alumina, silica, zirconia and activated carbon, $Cr/SiO_2$, $Zr/Al_2O_3$ and Ti/MgO, oxide, supported chromium bis(arene)Cr0, chromium oxides supported on silica, alumina or titania.

In one embodiment, step b) is continued until the thickness of the polymer layer is at least 10-100 nm, or 20-90 nm, or 30-80 nm, or 40-60 nm. For certain applications it may be useful to have a thicker film i.e. several layers of polymer layers, whereas for other applications a thinner film with less layers may be useful. The number of layers i.e. the thickness of the film may affect the active material content and configuration at micro or nano level, which may affect the film properties such as conductivity, capacitance, sheet resistance, band gap, active surface area, and transparency.

In the context of this specification, the term "deposition surface" may refer to a surface of the substrate as such or to a surface covered with an oxidant layer. The "deposition surface" may further refer to the surface covered with a polymer layer, which lies on top of the oxidant layer or the substrate. It may further refer to a surface covered with sequential layers of the oxidant and/or polymer layers, wherein the first layer on the surface of the substrate is the oxidant layer followed by the polymer layer, and so on. The "deposition surface" thus changes during the (deposition) process, when chemicals are applied onto the surface.

The term "film" should be understood in this specification, unless otherwise stated, as referring to a structure having its lateral dimensions substantially larger than its thickness. In that sense, a film may be considered as being a "thin" structure.

The expression that the film is "situated on" the surface of the substrate should be understood in this specification, unless otherwise stated, as meaning that the film is formed to lie on or upon the substrate or is being at least partly embedded therein. The substrate may serve as a carrier or support structure for the film. The substrate can be changed and the material of the substrate can vary according to the application to which the film is to be used. In one embodiment, the substrate is rigid. In one embodiment, the substrate is flexible, bendable, and/or can be rolled up.

In one embodiment, the polymer layer is a 1,3-polyazulene layer. In one embodiment, the film comprises at least one 1,3-polyazulene layer. In one embodiment, the film consists of at least one polymer layer formed of PAz, or of a copolymer, wherein one of the monomers is azulene, or of any combination thereof. In one embodiment, the film consists of one or more polymer layers formed of PAZ, or of a copolymer, wherein one of the monomers is azulene, or of any combination thereof. In one embodiment, the film consists of at least one polymer layer formed of PAz, or of a copolymer, wherein one of the monomers is azulene, or of any combination thereof, and at least one oxidant layer. In one embodiment, the film consists of one or more polymer layers formed of PAZ, or of a copolymer, wherein one of the monomers is azulene, or of any combination thereof, and one or more oxidant layers.

In one embodiment, the polymer layer is formed at least on one side of the substrate. In one embodiment, the polymer layer is formed on a top and a bottom side of the substrate.

In one embodiment, step b) is continued for 1-20 minutes, or 2-16 minutes, or 4-8 minutes. The polymerization time may affect the thickness of the polymer layer formed of PAz, or of a copolymer, wherein one of the monomers is azulene, or of any combination thereof. If the polymerization is continued for a longer time, the polymer layer may be thicker. It may also be possible that after a certain time period the layer will no longer get thicker although the polymerization is continued. This may be due to the fact that once the deposition surface covered with an oxidant layer is completely occupied by polymerized polymer, the monomer is unable to reach the oxidant even if polymerization is continued for a longer time. It may only deposit monomer as such but it will not be polymerized. Further, the deposited non-polymerized monomer may be rinsed away during the washing of the film leaving only polymerized film behind.

In one embodiment, the polymer layer is formed on the deposition surface by atmospheric pressure vapour phase polymerization (VPP). VPP is a polymerization technique where only the monomer is converted into vapour phase. The VPP carried out in atmospheric pressure has the added utility of being easy to control. It may not need pressure control or sophisticated device or vacuum oven. The method may be used also for production of large area films.

In one embodiment, the VPP is carried out in a reaction chamber or cell. In one embodiment, the temperature of the reaction chamber or cell is controlled. In one embodiment, the temperature of the reaction chamber or cell is controlled with thermostat baths.

In one embodiment, during step b), the temperature of the deposition surface is 25-75° C., or 30-60° C., or 35-65° C., 40-50° C., or 45-55° C.

In one embodiment, during step b), the polymerization temperature is 25-90° C., or 35-85° C., or 40-80° C., or 45-75° C., or 50-70° C., or 55-65° C. The use of a low polymerization temperature has the added utility of saving costs as less electricity is used. It may also be suitable for temperature sensitive substrates, such as biomolecule treated substrates or plastic and other delicate substrates.

In one embodiment, during step b), the temperature of the deposition surface differs from the polymerization temperature by 0-30° C., or 1-25° C., or 5-20° C., or 10-15° C.

In one embodiment, during step b), the temperature of the deposition surface is 0-30° C., or 1-25° C., or 5-20° C., or 10-15° C. lower than the polymerization temperature, or 0-20° C., or 1-15° C., or 5-10° C. higher than the polymerization temperature. In one embodiment, during step b), the temperature of the deposition surface is 0-30° C., or 1-25° C., or 2-25° C., or 3-25° C., or 4-20° C., or 5-20° C., or 10-15° C. lower than the polymerization temperature, or 0-20° C., or 1-15° C., or 2-15° C., or 3-15° C., or 4-10° C., or 5-10° C. higher than the polymerization temperature.

The temperature of the deposition surface may affect the sheet resistance of the film. It may increase or decrease the sheet resistance. Further, it may affect the stability of the film configuration and in some cases avoid fracture due to stress during washing. Decrease in sheet resistance after temperature treatment may mean either that the doping level is decreasing or that polymer chain structures are reorganizing or breaking. In one embodiment, the temperature of the deposition surface is at least, or above, 0° C. In one embodiment, the temperature of the deposition surface is at least, or above, room temperature.

In one embodiment the polymerization temperature is 20-95° C. and the temperature of the deposition surface is 25-75° C., the polymerization temperature is 25-90° C. and the temperature of the deposition surface is 25-75° C., or the polymerization temperature is 35-85° C. and the temperature of the deposition surface is 30-70° C., or the polymerization temperature is 40-80° C. and the temperature of the deposition surface is 35-65° C., or the polymerization temperature is 45-75° C. and temperature of the deposition surface is 40-50° C., or the polymerization temperature is 50-60° C. and temperature of the deposition surface is 45-55° C.

In one embodiment, the cell or the reaction chamber contains a saturated amount of monomer vapour(s). The amount may depend on the size of the cell or the chamber.

In one embodiment, the oxidant is selected from a group consisting of iron (II), iron (III), cerium (IV) and copper (II) salts. In one embodiment, the oxidant is selected from a group consisting of FETOS, $FeCl_3$, $CuCl_2$, $CuBr_2$, and $Fe(OTf)_3$. The oxidizing strength of the oxidants may vary. The film structure and polymer configuration may change depending on which oxidant is used. In one embodiment, the $CuCl_2$ oxidant provides films of high quality. In one embodiment, the $Fe(OTf)_3$ oxidant provides films of high quality. In one embodiment, the FETOS oxidant provides films of high quality. In one embodiment, the $CuBr_2$ oxidant provides films of high quality.

In one embodiment, the concentration of the solution comprising the oxidant is 60-500 mM, or 70-480 mM, or 120-320 mM, or 180-240 mM. The solvent in the solution comprising the oxidant may be selected from a group consisting of organic solvents such as n-butanol, methyl alcohol, 2-butyl alcohol, n-propyl alcohol, iso-propanol, ethyl cellosolve, ethyl alcohol, ethyl acetate, acetonitrile and methyl ethyl ketone and mixtures thereof. The purpose of the oxidant is to deprotonate the monomer and initiate the polymerization. In one embodiment, the solution consists of a solvent and an oxidant. In one embodiment, the oxidant layer is dried before polymerization. By drying the oxidant layer before polymerization, one is able to remove traces of solvents before proceeding into the polymerization step. In one embodiment, the polymerization reaction is a gas-solid reaction having interface.

In one embodiment, the solution comprising the oxidant is spin coated on the deposition surface. In one embodiment, the solution comprising the oxidant is spin coated on the deposition surface at 1000-2800 rpm for 20-90 s. In one embodiment, the solution comprising the oxidant is spin coated on the deposition surface at 1200-2600 rpm, or 1400-2400 rpm or 1600-2200 rpm, or 1800-2000 rpm for 30-80 s, or 40-70 s, or 50-60 s. In one embodiment, the oxidant coated deposition surface is dried before step b). In one embodiment, the oxidant coated deposition surface is dried on a hot plate at a temperature of 70-110° C. for 10-150 s, e.g. at 90° C. for 90 s.

In one embodiment, the method comprises the step of cleaning the deposition surface before step a). In one embodiment, the substrate may be cleaned by ultra-sonication with a solvent. In one embodiment, the solvent for the ultra-sonication may be selected from the group consisting of organic solvents. In one embodiment, the solvent for the ultra-sonication is selected from a group consisting of acetone, EtOH, water and mixtures thereof.

In one embodiment, the cleaned deposition surface may be dipped into a hot solution. In one embodiment, the cleaned deposition surface may be dipped in hot solution of $H_2O$:$NH_4OH$ (25%):$H_2O_2$ (30 g) as 5:1:1 volume ratio at a temperature of 50-100° C., e.g. 85° C. The cleaning has the added utility of removing any organic impurities left behind on the surface. In one embodiment, an oxygen plasma treatment may follow. Oxygen plasma treatment refers to a plasma treatment where oxygen is introduced to a plasma chamber. The oxygen plasma treatment has the added utility to further clean the substrate. Oxygen is the most common gas used in plasma cleaning technology due to its low cost and wide availability.

In one embodiment, the method comprises, after step b), the step of annealing the film at a temperature of 60-100° C. In one embodiment, the temperature of the annealing step is 70-90° C. or about 80° C. In one embodiment, annealing of the film is continued for 140-40 s, or 50-120 s, or 60-90 s e.g. for 120 s. Annealing may be done on a hot plate or in an oven. In one embodiment, the system comprises a heating unit configured to anneal the film at a temperature of 60-100° C.

In one embodiment, after annealing, the film is cooled to room temperature. The film can be annealed to avoid stress fracture of the film during the washing step. In one embodiment, the annealed and cooled film is washed. In one embodiment, the washing comprises dip rinsing the film with MeCN and/or with EtOH. The washing has the added utility of removing unreacted oxidant, monomer and any other impurities that may decrease the conductance. The solvent used may affect the sheet resistance of the film. The sheet resistance may be reduced e.g. due to water traces present in the solvent. In one embodiment, after washing, the film is dried under dry nitrogen gas stream.

In one embodiment, the substrate is non-conductive. In one embodiment, the substrate comprises or consists of glass, rubber, polymer, or any combination of these. In one embodiment, the glass may be a microscope glass slide or fluorine-doped tin oxide (FTO) glass or indium tin oxide (ITO) coated glass. In one embodiment, the non-conductive substrate comprises or consists of a polymer. The polymer may be polyethylene terephthalate (PET). In one embodiment, the rubber is selected from a group consisting of ethylene propylene rubber (EPR) and ethylene propylene diene monomer (M-class) rubber (EPDM rubber).

In one embodiment, thickness of the substrate is 5 μm-2 cm. The thickness of the substrate may vary depending on the purpose of the use of the film or the material of the substrate.

The expression that the substrate is "non-conductive" should be understood in this specification, unless otherwise stated, as meaning that the substrate has a sheet resistance of 10 Mohms/square (M/□) or higher.

In one embodiment, the substrate is conductive e.g. fluorine-doped tin oxide (FTO) glass or Indium oxide tin (ITO) coated glass or Gold (Au) coated substrate or Silver (Ag) coated substrate or silicon. Depending on the application, a conductive or non-conductive substrate may be useful.

The roughness of the film, sometimes also referred to as surface roughness, is a measure of the deviations in the direction of the normal vector of a real surface from its ideal form. If the deviations are large, the surface is rough; if the deviations are small, the surface is smooth.

In one embodiment, the average roughness (Ra) of the film is below 200 nm, or below 150 nm, or below 100 nm, or below 80 nm, or below 50 nm, or below 25 nm, or below 15 nm, or below 10 nm.

Roughness average values of the PAz films are obtained from the AFM images by using WSXM 5 software. The roughness average is the mean of the difference, in absolute value, between the average height and the height of each single point of the sample. This number varies with the interval range. It shows how uniform or rough the PAz film is. It may be calculated with the following equation (1)

$$r.a = \frac{\sum_{i,j} |a_{i,j} - <a>|}{N} \quad (1)$$

wherein r.a stands for roughness average,

<a> is the average height, aij is the height at each single point of the sample, i and j denotes the position of single point (entries) on two dimensional surface; and N is the number of "aij" points considered on the surface.

Root mean square (RMS) of the roughness of the films are obtained from the AFM images by using WSXM 5 software. It may be calculated with the following equation (2)

$$\text{rms} = \sqrt{\frac{\sum_{i,j} (a_{i,j} - <a>)^2}{N}} \quad (2)$$

This number varies with the interval range. Minimum value: minimum value of the height of the interval of interest. Maximum value: maximum value of the height of the interval of interest.

In one embodiment, the roughness of the film is measured before annealing and washing steps. This may be useful to check how these steps affect the roughness of the film since it is an important property of the film.

A smooth film has the added utility that the conductivity and transmittance thereof may remain even over the whole surface of the film.

In one embodiment, the transmittance of the film is 10-95%, or 20-85%, or 30-75%. In one embodiment, the transmittance of the film is measured at 300-1100 nm, or at 550-1100 nm, or at 550 nm.

Agilent 8453 spectrometer can be used to record the UV-Vis spectra. The % Transmittance (% T) is calculated from the absorbance data by using following equation (3), $$(\%\ T)=(10^{\wedge}(-\text{Abs}))*100 \quad (3)$$

In one embodiment, the areal capacitance of the film is 0-10 $mF/cm^2$, or 0.01-9 $mF/cm^2$, or 0.05-8 $mF/cm^2$, or 0.2-7 $mF/cm^2$, or 1-5 $mF/cm^2$, or 2-4 $mF/cm^2$. In one embodiment, the areal capacitance of the film is 0-25 $mF/cm^2$, or 0.01-15 $mF/cm^2$, or 0.05-10 $mF/cm^2$, or 0.2-7 $mF/cm^2$, or 1-5 $mF/cm^2$, or 2-4 $mF/cm^2$.

In one embodiment, the volumetric capacitance of the film is 200-2000 $F/cm^3$, or 250-1500 $F/cm^3$, or 300-1200 $F/cm^3$, or 500-1000 $F/cm^3$, or 600-800 $F/cm^3$. In one embodiment, the volumetric capacitance of the film is 5000-18000 $F/cm^3$, or 6000-17500 $F/cm^3$, or 7000-17000 $F/cm^3$.

In one embodiment, the areal and volumetric capacitance values are determined by electrochemical characterization with cyclic voltammetry (CV). The charge (Q) is calculated by integration of the cyclic voltammogram in the potential range-0.25 V to 0.9 V in the Origin software which is further processed by using equations (4) and (5) to obtain capacitance values:

$$\text{Areal capacitance, } C_A=Q/(\Delta V*A) \quad (4)$$

$$\text{Volumetric Capacitance, } C_V=Q/(\Delta V*V) \quad (5)$$

Where, 'ΔV' is the potential window, 'A' is the area and 'V' is the volume of working electrode. (Note: All solutions were purged with dry nitrogen gas for 15 min prior to measurement).

In one embodiment, the conductivity of the film is 0-3 S·cm, or 0.01-2 S·cm, or 0.05-1.5 S·cm, or 0.1-1.0 S·cm, or 0.3-0.8 S·cm, or 0.4-0.6 S·cm. The conductivity may be measured before or after the washing of the film. After the washing the conductivity value may be higher or lower than before the washing step. At low polymerization temperatures, the conductivities are lower before the washing step. At high polymerization temperatures, the conductivities are lower after the washing step.

In one embodiment, the sheet resistance of the film is 1-80 MΩ/□, or 2-70 MΩ/□, or 5-50 MΩ/□ or 10-40 MΩ/□, or 15-30 MΩ/□. In one embodiment, the sheet resistance of the film is 0.01-2 MΩ/□, or 0.05-1.5 MΩ/□, or 0.08-1.1 MΩ/□, or 0.2-1.1 MΩ/□, or 0.6-1 MΩ/□. The sheet resistance may be measured before or after the washing of the film. After the washing the sheet resistance value may be higher or lower than before the washing step. At low polymerization temperatures, the sheet resistance values are lower after the washing step. At high polymerization temperatures, the sheet resistance values are higher after the washing step.

In one embodiment, the sheet resistance is measured before annealing and washing steps. This may be useful to check how these steps affect the resistance of the film.

Jandel model RM3000+ with cylindrical four point probe head was used to obtain sheet resistance ($r_{sheet}$) values for the PAZ films. The specific resistance (r) of the film is obtained by multiplying sheet resistance with film thickness (d), equation (6):

$$r=r_{sheet}\,d \quad (6)$$

The conductivity (s) of the film is obtained according to equation (7)

$$S=1/r \quad (7)$$

The present application further relates to a device comprising a film of the present application.

In one embodiment, the device is an organic electrochemical transistor, an electrochemical transducer, an electrochromic device, an electroluminescent device, an electroluminescent display, an organic capacitor, a supercapacitor, a sensor, a biosensor, an energy harvesting device, an antistatic material, a photovoltaic device, a storage device or a thermoelectric device.

The present application further relates to the use of the film as an antistatic coating or an electrode in/of an electronic device.

The method described in the current application has the added utility of producing highly organized, transparent, homogenous, multilayer thin films. Further, the method described in the current application has the added utility of being low cost, simple and fast due to atmospheric pressure controlled polymerization, short reaction time, low temperature and low monomer loading.

The method described the in current application has the added utility of allowing layer by layer preparation of the film which may be useful in different applications. The method described in the current application has the added utility of allowing preparation of flexible thin films on plastic materials which may be used in bendable electronics. Further, the method allows the preparation of thin films of nanometre to micrometre scale.

The method described in the current application has the added utility of being suitable for the preparation of films with different properties, e.g. conductivities and roughness values, being thus useful for a variety of applications.

EXAMPLES

Reference will now be made in detail to example of which is various embodiments, an illustrated in the accompanying drawing.

The description below discloses some embodiments in such a detail that a person skilled in the art is able to utilize the embodiments based on the disclosure. Not all steps or features of the embodiments are discussed in detail, as many of the steps or features will be obvious for the person skilled in the art based on this specification.

For reasons of simplicity, item numbers will be maintained in the following exemplary embodiments in the case of repeating components.

FIG. 1 illustrates a film comprising PAZ layers prepared by VPP according to one embodiment described in the present application. The film 1 may comprise one or more layers of the oxidant 2 and one or more polymer layers 3, wherein the layers are situated on a surface of a substrate 4 one upon the other so that the first layer on top of the substrate is the oxidant layer. Oxidant layer may also be washed away during the production method, i.e. the film may not necessarily contain (a) oxidant(s) layer(s).

Figure 2:
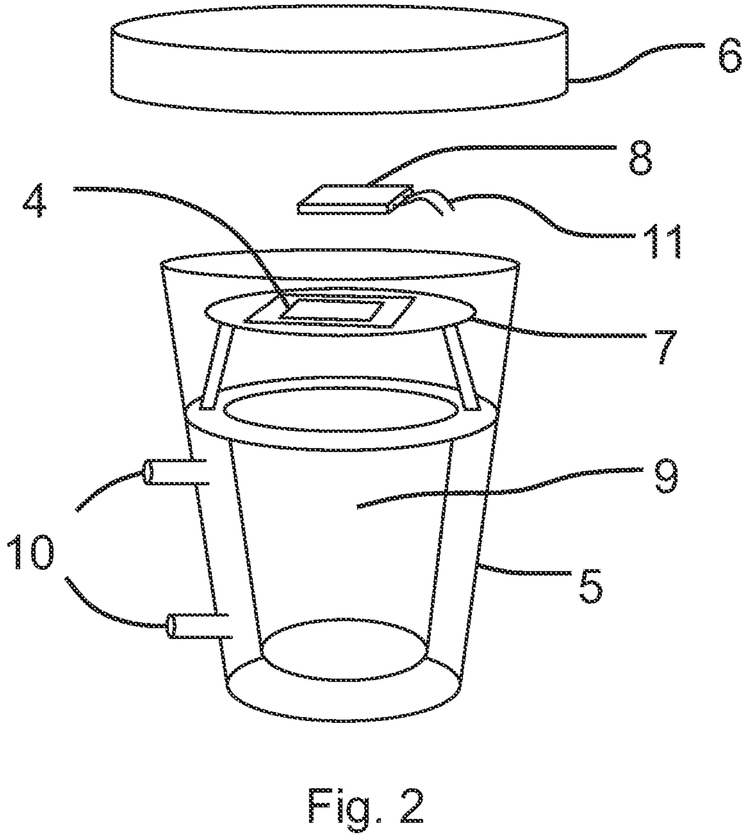
FIG. 2 illustrates a vapour phase polymerization cell for carrying out the vapour phase polymerization.

FIG. 2 illustrates a VPP chamber for carrying out VPP according to one embodiment described in the present application. The polymerization or reaction chamber 5 comprises a stand 7 for the substrate 4 and for the metal block 8. Thermostatic baths 10 are attached to the polymerization chamber 5 to keep the temperature of the monomer vapour(s) 9 at the polymerization temperature. The thermostatic bath 11 is attached to the metal block 8 to keep the temperature of the substrate 4 and thus the temperature of the deposition surface at the controlled predetermined temperature. The polymerization chamber 5 comprises a lid 6 which is used to close the polymerization chamber 5.

Figure 3:
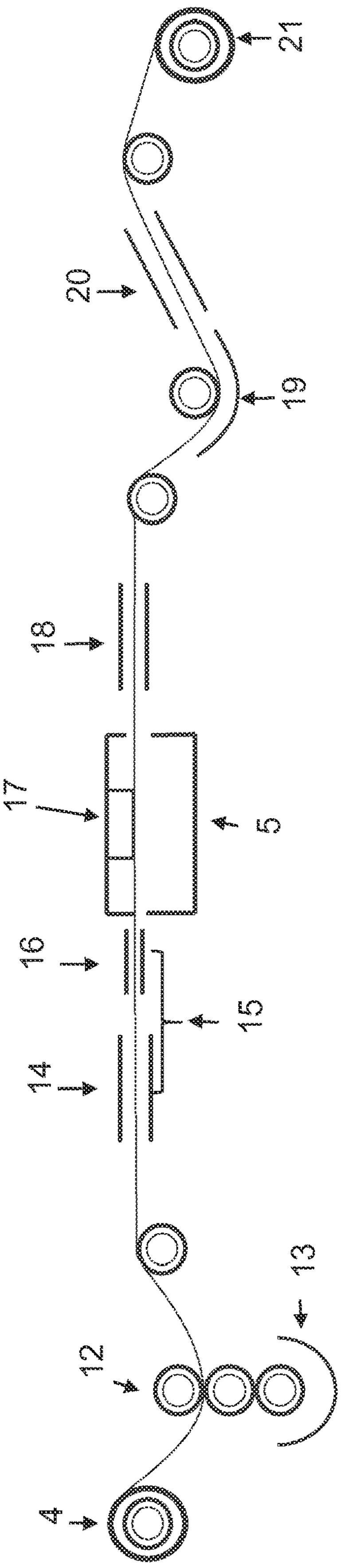
FIG. 3 illustrates a continuous set up for carrying out continuous vapour phase polymerization for flexible substrates.
Figure 4:
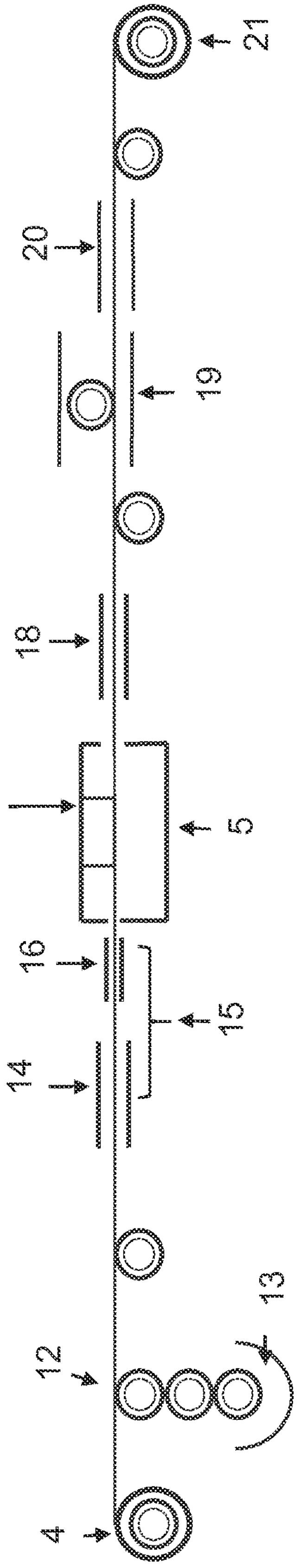
FIG. 4 illustrates a continuous set up for carrying out continuous vapour phase polymerization for rigid substrates.

FIGS. 3 and 4 illustrate the set ups for a continuous VPP process for flexible (FIG. 3) and rigid (FIG. 4) substrates according to one embodiment described in the present application. Solution comprising the oxidant 13 is deposited on the substrate 4 by roll to roll technique 12, followed by drying of the oxidant 14 and preheating 16 in an oven or with a heater 15. In the next step, the substrate 4 covered with an oxidant is exposed to monomer vapour(s) in the polymerization chamber or cell 5. The speed of the rollers determines the time substrate spends inside the chamber. Temperature of the substrate or the deposition surface is controlled with a heater/temperature controller 17. Next, the film is annealed 18, followed by the washing of the solvent 19. Finally, the film is dried (with nitrogen gas) 20 and the substrate covered with a film 21 is obtained.

Figure 5:
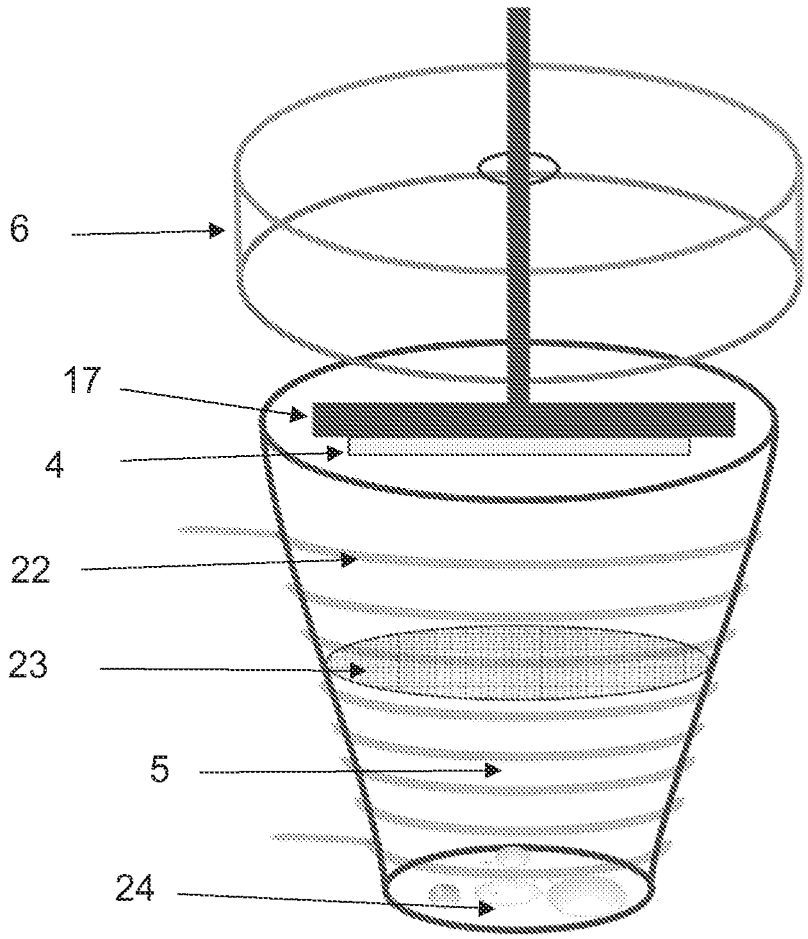
FIG. 5 illustrates a scaled up vapour phase polymerization cell for carrying out the vapour phase polymerization in a larger scale.

FIG. 5 illustrates a scaled up VPP chamber for carrying out VPP according to one embodiment described in the present application. The polymerization chamber 5 includes the substrate 4 and a heater/temperature controller 17 for the substrate. Heating coils 22 are used to vaporize the monomer and heat it to the polymerization temperature. The chamber further includes a vapour homogenizer 23 and an adjustable lid 6 to close the polymerization chamber 5.

Example 1—Preparation of a Film Comprising Polymer Layers

A substrate was cleaned by ultra-sonication with acetone, water and EtOH, respectively in each for 5 min. The cleaned glass substrate was dipped in hot solution (80° C.) of $H_2O$:$NH_4OH$ (25%):$H_2O_2$ (30%) as 5:1:1 volume ratio for 5 min to remove any organic impurities left behind on the surface. The substrate was then cleaned by oxygen plasma treatment for 3 min. The 60 mM solution comprising the oxidant $CuCl_2$ was prepared using n-butanol as a solvent. 80 µl of the solution comprising the oxidant was spin coated on the substrate at 2400 rpm for 60 s. The oxidant coated substrate was dried on a hot plate at 90° C. for 90 s. The dried substrate was immediately transferred to a preheated cell (FIG. 2) containing azulene monomer at 56° C. in such a way that the coated surface faced down towards the vapors. Polymerization was carried out for 4 min. Annealing of the film was done after polymerization on a hot plate at 90° C. for 120 s. After annealing, the film was let to cool to room temperature and rinsed thoroughly in MeCN to remove unreacted oxidant, monomer and any other impurities. After washing, the film was dried under dry nitrogen gas stream. The procedure was repeated from the spin coating step one or more times to prepare multiple layers of PAz on the substrate. The temperature of the cell was controlled by thermostat baths.

The procedure described above was repeated with several different oxidants and oxidant concentrations to produce single- or multilayer PAz films with different properties.

The same procedure may be used for different substrates. Further, the step of annealing may, in some cases, be left out.

Example 2—Preparation of a Film Comprising Polymer Layers

The procedure described above for example 1 was followed but the polymer layer was formed of a copolymer, wherein one of the monomers was azulene and the additional monomer was 3,4-ethylenedioxythiophene. Both monomers were exposed simultaneously to the deposition surface. The parameters during the example as well as the results are discussed below in relation to Table 4.

Results

FIG. 6 describes changes in roughness, sheet resistance, and conductivity of PAz films prepared by varying first the polymerization temperatures while keeping the deposition surface temperature (about room temperature) and polymerization time (4 minutes) constant, and then varying the deposition surface temperatures while keeping the polymerization temperature (55° C.) and polymerization time (4 minutes) constant, and finally, varying the polymerization time (from 2 to 16 minutes) while keeping the polymerization temperature (55° C.) and (about room deposition surface temperature temperature) constant. All the films presented in FIG. 6 were prepared by using 80 µl of 240 mM $CuCl_2$ oxidant solution. The oxidant was spin coated on the substrate with a spin coating speed of 2400 rpm. The oxidant layer was dried at 90° C. for 90 s. No annealing was performed. The films were washed two times with acetonitrile and dried under nitrogen gas stream. In FIG. 6, "NC" denotes non conducting.

Table 1 describes the changes in areal and volumetric capacitance and charge values for one layer (1 L), three layers (3 L) and six layers (6 L) PAz films prepared using different concentrations of $CuCl_2$ or FETOS oxidants. All the films were prepared using 80 µl of oxidant solution. The oxidant was spin coated on the substrate with a spin coating speed of 2400 rpm. The oxidant layer was dried at 90° C. for 90 s. Polymerization time per layer was 4 minutes and polymerization temperature was 55° C. Annealing was performed for all the other films except entries 1 to 6. The films were washed two times with acetonitrile and dried under nitrogen gas stream. Temperature of the deposition surface was at about room temperature.

TABLE 1

Changes in areal and volumetric capacitance values and charges of 1L, 3L and 6L PAz films.

| Entry | Scan rate (mV/s) | Layers | Oxidant | Charge (mC) | Areal Capacitance MF/cm$^2$ | Volumetric Capacitance Range (F/cm$^3$) | |
|---|---|---|---|---|---|---|---|
| 1 | 20 | 1L | $CuCl_2$ | 1.58 | 1.22 | 304 | 608 |
| 2 | 200 | | (240 | 1.29 | 0.99 | 248 | 496 |
| 3 | 20 | 3L | mM) | 5.13 | 3.95 | 493 | 987 |
| 4 | 200 | | | 4.88 | 3.76 | 469 | 939 |
| 5 | 20 | 6L | | 11.17 | 8.60 | 781 | 1910 |
| 6 | 200 | | | 8.51 | 6.55 | 595 | 1455 |
| 7 | 20 | 1L | $CuCl_2$ | 1.82 | 1.40 | 350 | 700 |
| 8 | 200 | | (240 | 1.64 | 1.26 | 316 | 631 |
| 9 | 20 | 3L | mM) | 5.88 | 4.52 | 566 | 1131 |
| 10 | 200 | | | 5.05 | 3.89 | 486 | 972 |
| 11 | 20 | 1L | FETOS | 2.92 | 2.25 | n.a | n.a |
| 12 | 200 | | (240 | 0.25 | 0.19 | n.a | n.a |

TABLE 1-continued

Changes in areal and volumetric capacitance values and charges of 1L, 3L and 6L PAz films.

| Entry | Scan rate (mV/s) | Layers | Oxidant | Charge (mC) | Areal Capacitance MF/cm$^2$ | Volumetric Capacitance Range (F/cm$^3$) | |
|---|---|---|---|---|---|---|---|
| 13 | 20 | 3L | mM) | 3.75 | 2.89 | n.a | n.a |
| 14 | 200 | | | 0.37 | 0.29 | n.a | n.a |
| 15 | 20 | 1L | $CuC1_2$ | 1.66 | 1.28 | 394 | 946 |
| 16 | 200 | | (180 | 1.1 | 0.85 | 261 | 627 |
| 17 | 20 | 3L | mM) | 4.16 | 3.20 | 420 | 1007 |
| 18 | 200 | | | 3.69 | 2.84 | 373 | 893 |
| 19 | 20 | 1L | FETOS | 4.07 | 3.13 | n.a | n.a |
| 20 | 200 | | (180 | 0.24 | 0.18 | n.a | n.a |
| 21 | 20 | 3L | mM) | 9.08 | 6.99 | n.a | n.a |
| 22 | 200 | | | 0.91 | 0.70 | n.a | n.a |
| 23 | 20 | 1L | $CuC1_2$ | 1.09 | 0.84 | n.a | n.a |
| 24 | 200 | | (120 | 0.60 | 0.46 | n.a | n.a |
| 25 | 20 | 3L | mM) | 2.69 | 2.07 | n.a | n.a |
| 26 | 200 | | | 2.17 | 1.67 | n.a | n.a |
| 27 | 20 | 1L | FETOS | 2.57 | 1.98 | n.a | n.a |
| 28 | 200 | | (120 | 0.34 | 0.26 | n.a | n.a |
| 29 | 20 | 3L | mM) | 5.28 | 4.06 | n.a | n.a |
| 30 | 200 | | | 0.45 | 0.34 | n.a | n.a |
| 31 | 20 | 1L | $CuBr_2$ | 0.62 | 0.48 | n.a | n.a |
| 32 | 200 | | (120 | 0.15 | 0.12 | n.a | n.a |
| 33 | 20 | 3L | mM) | 0.91 | 0.70 | n.a | n.a |
| 34 | 200 | | | 0.41 | 0.31 | n.a | n.a |
| 35 | 20 | 1L | $FeC_{13}$ | 0.29 | 0.22 | n.a | n.a |
| 36 | 200 | | (120 | 0.12 | 0.09 | n.a | n.a |
| 37 | 20 | 3L | mM) | 0.30 | 0.23 | n.a | n.a |
| 38 | 200 | | | 0.10 | 0.08 | n.a | n.a |
| 39 | 20 | 3L | $CuC_{12}$ | 1.33 | 1.02 | n.a | n.a |
| 40 | 150 | | (60 mM) | 0.90 | 0.69 | n.a | n.a |
| 41 | 20 | 3L | FETOS (60 | 2.56 | 1.97 | n.a | n.a |
| 42 | 150 | | mM) | 0.59 | 0.45 | n.a | n.a |
| 43 | 20 | 3L | $CuBr_2$ | 0.43 | 0.33 | n.a | n.a |
| 44 | 150 | | (60 mM) | 0.06 | 0.05 | n.a | n.a |
| 45 | 20 | 3L | $FeC1_3$ | 0.36 | 0.28 | n.a | n.a |
| 46 | 150 | | (60 mM) | 0.13 | 0.10 | n.a | n.a |

n.a = not available

Table 2 describes the sheet resistance and conductivity values for films comprising PAz layer(s) prepared using $CuCl_2$ as the oxidant. All the films were prepared using 80 μl of oxidant solution. The oxidant was spin coated on the substrate with a spin coating speed of 2400 rpm. The oxidant layer was dried at 90° C. for 90 s. Polymerization time per layer was 4 minutes and polymerization temperature was 55° C. Annealing was performed for all the other films except films in entries 1 to 4. In entries 5 to 8 the sheet resistance is measured before annealing step. The films were washed two times with acetonitrile and dried under nitrogen gas stream. Temperature of the deposition surface was not controlled i.e. it was at about room temperature. All the sheet resistance values are measured immediately after film preparation.

TABLE 2

Sheet resistance and conductivity of values of 1L, 3L and 6L PAz films prepared with $CuCl_2$ as the oxidant.

| Entry | Layers | Oxidant | Sheet resistance (MΩ/□) | Conductivity (S/cm) | | Thickness range (nm) | |
|---|---|---|---|---|---|---|---|
| 1 | 1L | $CuCl_2$ | 14.3 | 0.04 | 0.02 | 20 | 40 |
| 2 | 3L | (240 | 8.2 | 0.03 | 0.02 | 40 | 80 |

TABLE 2-continued

Sheet resistance and conductivity of values of 1L, 3L and 6L PAz films prepared with $CuCl_2$ as the oxidant.

| Entry | Layers | Oxidant | Sheet resistance (MΩ/□) | Conductivity (S/cm) | | Thickness range (nm) | |
|---|---|---|---|---|---|---|---|
| 3 | 6L | mM) | 7.4 | 0.03 | 0.01 | 45 | 110 |
| 4 | 6L | | 1.5 | 0.14 | 0.06 | 45 | 110 |
| 5 | 1L | $CuCl_2$ (240 | 2.9 | 0.17 | 0.09 | 20 | 40 |
| 6 | 3L | mM) | 2.5 | 0.10 | 0.05 | 40 | 80 |
| 7 | 1L | $CuCl_2$ (180 | 3.0 | 0.25 | 0.10 | 14 | 32 |
| 8 | 3L | mM) | 3.5 | 0.09 | 0.04 | 32 | 76 |

Table 3 describes the roughness variation of PAZ films prepared with different oxidants ($CuCl_2$, FETOS, $CuBr_2$ and $FeCl_3$) and oxidant concentrations. All the films were prepared using 80 μl of oxidant solution. The oxidant was spin coated on the substrate with a spin coating speed of 2400 rpm. The oxidant layer was dried at 90° C. for 90 s. Polymerization time per layer was 4 minutes and polymerization temperature was 55° C. Annealing was performed for all the other films except films in entries 1 to 3. The films were washed two times with acetonitrile and dried under nitrogen gas stream. Temperature of the deposition surface was not controlled i.e. it was at about room temperature.

TABLE 3

Roughness values of 1L, 3L and 6L PAz films prepared with different oxidants.

| Entry | Layers | Oxidant | Roughness (nm) RMS | Roughness (nm) $R_{avg}$ |
|---|---|---|---|---|
| 1 | 1L | $CuCl_2$ | 20.7 | 16.3 |
| 2 | 3L | (240 mM) | 20.9 | 16.1 |
| 3 | 6L | | 21.3 | 17.0 |
| 4 | 1L | $CuCl_2$ | 33.1 | 27.0 |
| 5 | 3L | (240 mM) | 22.1 | 17.6 |
| 6 | 1L | FETOS | 12.1 | 9.4 |
| 7 | 3L | (240 mM) | 177.0 | 145.0 |
| 8 | 1L | $CuCl_2$ | 8.3 | 5.8 |
| 9 | 3L | (180 mM) | 13.0 | 10.4 |
| 10 | 1L | FETOS | 47.2 | 31.2 |
| 11 | 3L | (180 mM) | 37.7 | 24.9 |
| 12 | 1L | $CuCl_2$ | 23.1 | 16.5 |
| 13 | 3L | (120 mM) | 27.3 | 21.1 |
| 14 | 1L | FETOS | 8.2 | 6.0 |
| 15 | 3L | (120 mM) | 0.1 | 0.1 |
| 16 | 1L | $CuBr_2$ | 6.3 | 4.0 |
| 17 | 3L | (120 mM) | 5.2 | 3.8 |
| 18 | 1L | $FeCl_3$ | 12.6 | 10.1 |
| 19 | 3L | (120 mM) | 27.6 | 21.9 |
| 20 | 3L | $CuCl_2$ (60 mM) | 9.9 | 7.8 |
| 21 | | FETOS (60 mM) | 10.1 | 6.8 |
| 22 | | $CuBr_2$ (60 mM) | 5.0 | 2.1 |
| 23 | | $FeCl_3$ (60 mM) | 13.5 | 8.6 |

Table 4 describes the sheet resistance, the transmittance and roughness values for films comprising a polymer layer formed of a copolymer, wherein the monomers are PAz and PEDOT prepared by using different oxidants. Table 4 further described these values for a film comprising a PAZ layer prepared without using the annealing step. All the films were prepared using 80 μl of oxidant solution. The oxidant was spin coated on the substrate with a spin coating speed of 2400 rpm. The oxidant layer was dried at 90° C. for 90 s. Polymerization time per layer was 4 minutes and polymerization temperature was 65° C. Annealing was performed for all the other films except films in entry 3. In entries 1 and 2 the sheet resistance is measured before annealing step. The films were washed two times with acetonitrile and dried under nitrogen gas stream. The temperature of the deposition surface was 55° C. in entries 1 and 2. In entry 3, the temperature of the deposition surface was not controlled i.e. it was at about room temperature. All the sheet resistance values are measured immediately after film preparation.

TABLE 4

Sheet resistance and roughness values of 1L PAz films and COPOL films prepared with different oxidants.

| Entry | Polymer | Oxidant | Abs at 550 nm | % T at 550 nm | Sheet resistance (MΩ/□) | Roughness (nm) RMS | Roughness (nm) Raverage |
|---|---|---|---|---|---|---|---|
| 1 | $CO_3$POL (PEDOT + PAz) | $CuCl_2$ | 0.12 | 76 | 61 | 13 | 10 |
| 2 | COPOL (PEDOT + PAz) | FETOS (+120 mM Pyridine) | 0.18 | 66 | 0.05-0.2 | 44 | 34 |
| 3 | PAz | Fe $(OTF)_3$ | 0.10 | 80 | 0.6-1.1 | 20 | 15 |

*number of layer in entries 1-3 was one (1L) and the oxidant concentration was 240 mM; Fe $(OTF)_3$ = Iron (III) trifluoromethanesulfonate

TABLE 5

Electrochemical characterization of 1L COPOL (240 mM $CuCl_2$)

| Potential range | Charge (mC) | Potential window (V) | Areal capacitance ($mF/cm^2$) | Volumetric capacitance range ($F/cm^3$) | | Thickness range (nm) | |
|---|---|---|---|---|---|---|---|
| −0.25 to 0.8 V | 1.61 | 1.05 | 1.4 | 428 | 1028 | | |
| −0.5 to 1.0 V | 3.69 | 1.5 | 2.2 | 687 | 1649 | | |
| −0.5 to −1.9 V | 34.86 | 1.4 | 22.0 | 6951 | 16693 | 13.2 | 31.7 |

*0.1 M $TBABF_4$ (tetrabutylammonium tetrafluoroborate) in Acetonitrile is used as electrolyte solution; scan rate = 50 mV/s

Characterization

Agilent 8453 (up to 1000 nm) was used to record UV-Vis-NIR measurements (background correction was done using an uncoated substrate).

Atomic force microscopy (AFM) measurements were carried out using Veeco diCaliber scanning probe microscope operated in a tapping mode at room temperature. All AFM images were recorded using Bruker TESP-MT probe (resonant freq. 320 kHz, spring const. 42 N/m, length 125 μm, width 30 μm, Cantilever spec: 0.01-0.025 Ωcm Antimony (n) doped Silicon, 4 μm thick, tip spec: 10-15 μm height, 8 nm radius). WSXM software was used to determine mean roughness (roughness average (Ra)) values of PAz films.

CV measurements were used for electrochemical characterization. CV measurements were carried out in conventional 3 electrode configuration using 0.1M TBA-BF4/MeCN. VPP prepared PAz films on a substrate covered with different number of PAz layers were used as working electrodes. A Ag/AgCl wire and a platinum wire were used as reference and counter electrode, respectively. Ag/AgCl reference electrode was calibrated before and after every electrochemical measurement using ferrocene redox couple (E1/2 (Fe/Fe+)=0.43 V). Cyclic voltammograms were recorded using Metrohm Autolab PGSTAT 101 potentiostat in a potential range from −0.25 V to 0.9 V with scan rates of 20-200 mV/s. The charge (Q) is calculated by integration of the cyclic voltammogram in the potential range-0.25 V to 0.9 V in the Origin software which is further processed by using the above presented equations (4) and (5) to obtain the capacitance values.

Jandel model RM3000+ with cylindrical four point probe head was used to calculate sheet resistance ($r_{sheet}$) for 1 L to 6 L PAz films. The specific resistance (r) and conductivity(s) of the film was calculated from equations (6) and (7).

Figure 7:
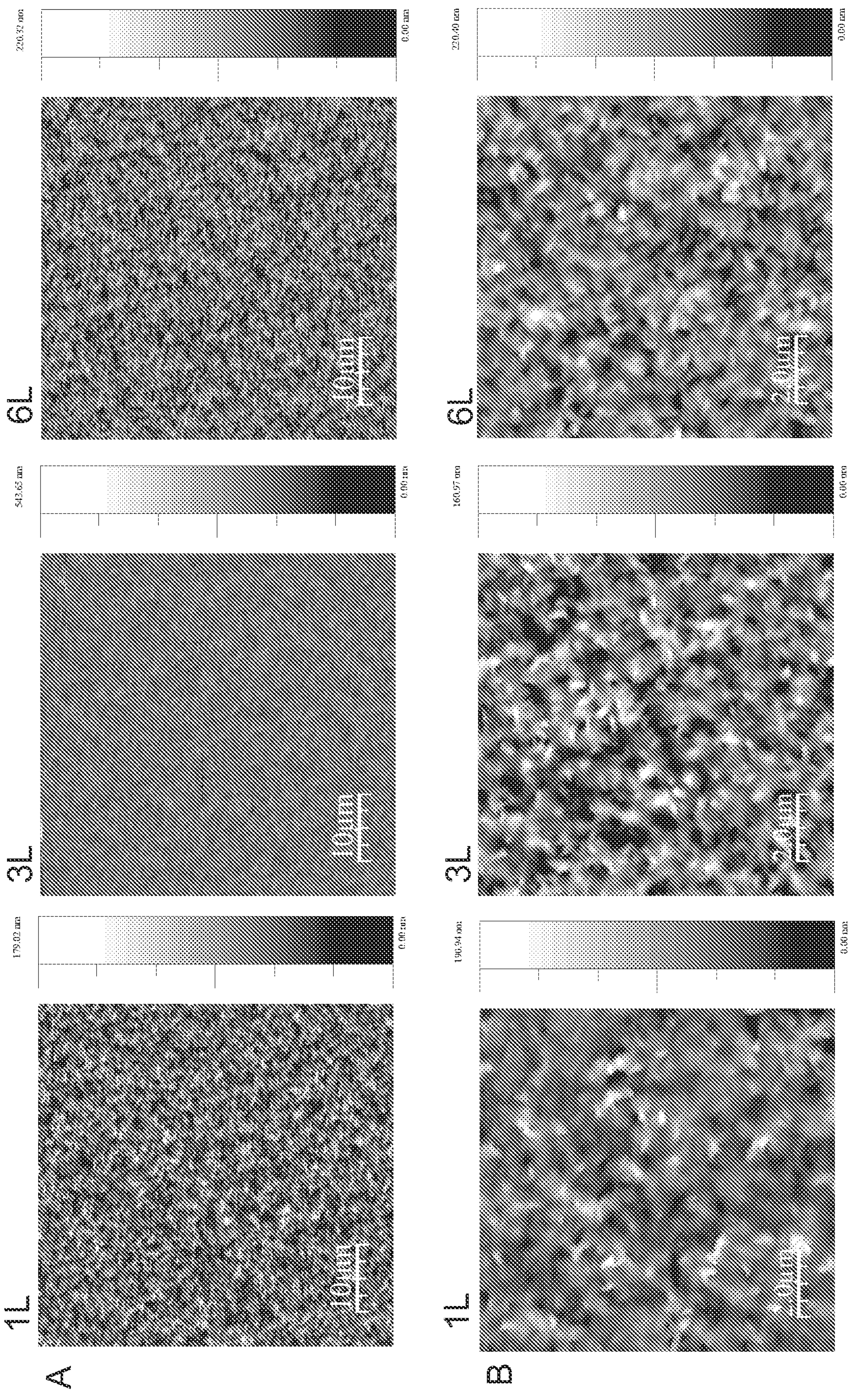
FIG. 7 illustrates AFM images of 1 L PAZ, 3 L PAz and 6 L PAz films with 50 by 50 μm and 10 by 10 μm sizes.

FIG. 7A illustrates AFM images of 1 L, 3 L and 6 L PAz films with sizes of 50 by 50 μm and FIG. 7B illustrates 1 L, 3 L and 6 L PAz films with sizes of 10 by 10 μm. All films were prepared via VPP using 80 μl of 240 mM $CuCl_2$ oxidant solution. The oxidant was spin coated on the substrate with a spin coating speed of 2400 rpm. The oxidant was dried at 90° C. for 90 s. Polymerization time was 4 minutes per layer and the cell temperature i.e. polymerization temperature was 55° C. All the films were washed two times in acetonitrile and dried under nitrogen gas stream. No annealing step was used.

It is obvious to a person skilled in the art that with the advancement of technology, the basic idea may be implemented in various ways. The embodiments are thus not limited to the examples described above; instead they may vary within the scope of the claims.

The embodiments described hereinbefore may be used in any combination with each other. Several of the embodiments may be combined together to form a further embodiment. A method, a film, a device, or a use disclosed herein, may comprise at least one of the embodiments described hereinbefore. It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items. The term "comprising" is used in this specification to mean including the feature(s) or act(s) followed thereafter, without excluding the presence of one or more additional features or acts.

The invention claimed is:

1. A method for fabricating a film comprising at least one polymer layer formed of polyazulene, or of a copolymer, wherein one of the monomers is azulene, or of any combination thereof, wherein the film is situated on at least one surface of a substrate, wherein the method comprises the steps of:

a) forming an oxidant layer on a deposition surface by applying a solution comprising an oxidant on the deposition surface;

b) forming a polymer layer formed of polyazulene, or of a copolymer, wherein one of the monomers is azulene, or of any combination thereof, by exposing the deposition surface to at least azulene monomer vapour at a polymerization temperature of 20-95° C. under atmospheric pressure, wherein step a) precedes step b), wherein, during step b), the temperature of the deposition surface differs from the polymerization temperature by 5-30° C., and wherein, during step b), the temperature of the deposition surface is 25-75° C.

2. The method of claim 1, wherein the method comprises repeating step a) and step b) one or more times.

3. The method of claim 1, wherein the polymer layer is formed on the deposition surface by atmospheric pressure vapour phase polymerization (VPP).

4. The method of claim 1, wherein step b) is continued for 1-20 minutes.

5. The method of claim 1, wherein step b) is continued until the thickness of the polymer layer is 10-100 nm.

6. The method of claim 1, wherein in step b), the deposition surface is exposed to at least azulene monomer vapour and at least one further monomer vapour selected from a group consisting of 3,4-ethylenedioxythiophene (EDOT), pyrrole, aniline, thiophene, and phenylene.

7. The method of claim 1, wherein the method is carried out as a batch process or a continuous process.

8. The method of claim 1, wherein, during step b), the polymerization temperature is 25-90° C.

9. The method of claim 1, wherein, during step b), the temperature of the deposition surface is 5-20° C. lower than the polymerization temperature or 5-10° C. higher than the polymerization temperature.

10. The method of claim 1, wherein the oxidant is selected from a group consisting of FETOS, $FeCl_3$, $CuCl_2$, $CuBr_2$, and $Fe(OTf)_3$.

11. The method of claim 1, wherein the concentration of the solution comprising the oxidant is 60-500 mM.

12. The method of claim 1, wherein the solution comprising the oxidant is spin coated on the deposition surface.

13. The method of claim 1, wherein the method comprises, after step b), the step of annealing the film at a temperature of 60-100° C.

* * * * *